(12) United States Patent
Qin et al.

(10) Patent No.: US 12,158,272 B2
(45) Date of Patent: Dec. 3, 2024

(54) CONTROL PANEL AND ELECTRIC COOKING APPLIANCE

(71) Applicant: IB APPLIANCES US HOLDINGS LLC, Downers Grove, IL (US)

(72) Inventors: Yi Qin, Ottawa (CA); YuDe Han, Ottawa (CA); Jiwei Wang, Ottawa (CA)

(73) Assignee: IB APPLIANCES US HOLDINGS LLC, Downers Grove, IL (US)

( * ) Notice: Subject to any disclaimer, the term of this patent is extended or adjusted under 35 U.S.C. 154(b) by 1206 days.

(21) Appl. No.: 15/930,742

(22) Filed: May 13, 2020

(65) Prior Publication Data

US 2020/0363069 A1   Nov. 19, 2020

(30) Foreign Application Priority Data

May 13, 2019   (CN) .......................... 201920681802.1

(51) Int. Cl.
  *F24C 7/08*   (2006.01)
  *F24C 15/08*  (2006.01)
  *H05B 1/02*   (2006.01)

(52) U.S. Cl.
  CPC .............. *F24C 7/082* (2013.01); *F24C 15/08* (2013.01); *H05B 1/0258* (2013.01)

(58) Field of Classification Search
  CPC ...... A47J 27/004; A47J 31/4407; A47J 36/00; F24C 15/08; F24C 7/082; H05B 1/0258
  USPC ....................................................... 219/391
  See application file for complete search history.

(56) References Cited

U.S. PATENT DOCUMENTS

| | | | | |
|---|---|---|---|---|
| 4,770,157 A | * | 9/1988 | Shepherd | A47J 37/0713 126/25 R |
| 5,768,976 A | * | 6/1998 | Suk | A47J 27/0806 220/325 |
| 6,705,209 B2 | * | 3/2004 | Yang | A47J 27/092 219/440 |
| 6,987,250 B2 | * | 1/2006 | Levy | F24F 6/00 219/508 |
| 7,872,213 B2 | * | 1/2011 | De Leon | A47J 27/004 99/422 |
| 2005/0072310 A1 | * | 4/2005 | Kim | A47J 43/044 99/348 |

(Continued)

FOREIGN PATENT DOCUMENTS

| | | | |
|---|---|---|---|
| EP | 0954949 B1 | * | 1/1998 |
| EP | 2993407 A1 | * | 3/2016 |

*Primary Examiner* — Nathaniel E Wiehe
*Assistant Examiner* — Ket D Dang
(74) *Attorney, Agent, or Firm* — Crowell & Moring LLP

(57) ABSTRACT

An operation panel and an electric cooking appliance are described herein. The electric cooking appliance comprises a substantially arc-shaped outer shell and an operation panel disposed on the outer shell, the operation panel comprising a substantially flat display panel and a control panel coupled to at least one side of the display panel. The control panel is inclinedly disposed relative to the display panel such that an overall shape of the operation panel at least partially approximates that of the arc-shaped shell. The control panel comprises at least one control key disposed thereon for operating the electric cooking appliance. Such a design provides an increased area of the display panel thereby providing a bigger displaying area without substantially enlarging the dimensions of the operation panel.

17 Claims, 6 Drawing Sheets

(56) References Cited

U.S. PATENT DOCUMENTS

| | | | |
|---|---|---|---|
| 2005/0184048 A1* | 8/2005 | DeCobert | A47J 36/32 |
| | | | 219/506 |
| 2015/0257208 A1* | 9/2015 | Li | H05B 6/6414 |
| | | | 219/702 |
| 2016/0198883 A1* | 7/2016 | Wang | A23L 5/10 |
| | | | 426/231 |
| 2017/0181564 A1* | 6/2017 | He | A47J 27/004 |
| 2018/0238551 A1* | 8/2018 | Ha | G05G 1/12 |
| 2019/0231131 A1* | 8/2019 | Gill | A23L 5/17 |

* cited by examiner

CONTROL PANEL AND ELECTRIC COOKING APPLIANCE

CROSS-REFERENCE TO RELATED APPLICATIONS

This application claims priority to Chinese Patent Application 201920681802.1 filed on May 13, 2019, the entire contents of which are incorporated herein by reference.

TECHNICAL FIELD OF THE INVENTION

The present invention relates generally to the field of small kitchen appliances, and more particularly to a control panel and an electric cooking appliance.

BACKGROUND OF THE INVENTION

Electric cooking appliances, such as electric pressure cookers, are commonly found household appliances. A conventional electric cooking appliance typically includes an operation panel having push buttons disposed thereon for controlling the operations of the electric cooking appliance. However, usually a significant area of the operation panel is reserved for the placement of the buttons. As a result, the display area of the operation panel is relatively small and therefore can be inconvenient to users.

SUMMARY OF THE INVENTION

The present invention provides an operation panel constructed and arranged to have an increased display area of the display panel, and provides an electric cooking appliance incorporating such an operation and display panel.

In accordance with one aspect of the present disclosure, there is provided an electric cooking appliance, comprising a substantially cylindrical or arc-shaped outer shell; and an operation panel disposed on the outer shell, the operation panel comprising a substantially flat display panel, and a control panel coupled to at least one side of the display panel; wherein the control panel is inclinedly disposed relative to the display panel such that an overall shape of the operation panel at least partially approximates that of the cylindrical or arc-shaped shell; and wherein the control panel comprises at least one control key disposed thereon for operating the electric cooking appliance.

In accordance with some embodiments of the present disclosure, the outer shell comprises at least one opening disposed thereon, the operation panel is assembled to the at least one opening, the operation panel comprises a first position-limiting member and a second position-limiting member disposed at an upper portion of the operation panel, and a fixing post disposed at a lower portion of the operation panel, wherein at least a portion of the outer shell is fastened between the first position-limiting member and the second position-limiting member, the outer shell further comprises a mounting aperture correspondingly disposed for engaging the fixing post, the electric cooking appliance comprises a fastener for securing the engagement between the mounting aperture and the fixing post from an interior side of the outer shell.

In accordance with some embodiments of the present disclosure, the operation panel comprises a rear installation panel secured to the outer shell, wherein the first position-limiting member, the second position-limiting member, and the fixing post are disposed on the rear installation panel.

In accordance with some embodiments of the present disclosure, the outer shell comprises a flange portion at least partially enclosing the opening of the outer shell, wherein at least a part of the flange portion is fastened between the first position-limiting member and the second position-limiting member.

In accordance with some embodiments of the present disclosure, the rear installation panel comprises a plurality of positioning protrusions for secure engagement with the opening of the outer shell, wherein one or more positioning protrusions are disposed on a left side and a right side of the rear installation panel, respectively, and are constructed and arranged to fittingly engage the flange portion of the outer shell.

In accordance with some embodiments of the present disclosure, the rear installation panel comprises a panel portion comprising a receptacle disposed thereon, wherein the first position-limiting member and the second position-limiting member extend from the panel portion, the operation panel further comprises an electric circuit board and a button panel disposed within the receptacle, the button panel comprises a substantially flat base portion and a pair of inclined portions inclinedly extending from a left side and a right side of the base portion, respectively, wherein the base portion is constructed and arranged to form or provide a shape for the substantially flat display panel, and the inclined portions are constructed and arranged to form or provide a shape for the inclinedly disposed control panel.

In accordance with some embodiments of the present disclosure, the operation panel comprises a decorative film covering the button panel, wherein the at least one control key comprises a push portion disposed on the button panel and a corresponding protrusion portion disposed on the decorative film.

In accordance with some embodiments of the present disclosure, the operation panel comprises a display screen connected to the electric circuit board and a transparent protective board disposed on an exterior of the display screen for protecting the display screen, wherein the base portion comprises a window disposed thereon for accommodating the display screen, wherein the transparent protective board is secured to the window or a portion thereof.

In accordance with some embodiments of the present disclosure, the operation panel comprises a rotary knob disposed at a lower part of the base portion, and at least one control key disposed on a left side and a right side of the rotary knob, respectively.

In accordance with another aspect of the present disclosure, there is provided an operation panel for assembling to a substantially cylindrical or arc-shaped outer shell, comprising a substantially flat display panel and a control panel coupled to at least one side of the display panel and inclinedly disposed relative to the display panel; wherein the control panel is inclinedly disposed such that an overall shape of the operation panel at least partially approximates that of the cylindrical or arc-shaped shell; and wherein the control panel comprises at least one control key disposed thereon for convenience of operation.

In accordance with some embodiments of the present disclosure, the operation panel comprises a rear installation panel secured to the outer shell, an electric circuit board and a button panel secured to the rear installation panel, wherein the button panel comprises a substantially flat base portion constructed and arranged to form or provide a shape for the substantially flat display panel, and a pair of inclined portions inclinedly extending from a left side and a right side of the base portion, respectively, wherein the inclined portions are constructed and arranged to form or provide a shape for the inclinedly disposed control panel.

In accordance with some embodiments of the present disclosure, the operation panel comprises a decorative film covering the button panel, wherein the at least one control key comprises a push portion disposed on the button panel and a corresponding protrusion portion disposed on the decorative film.

In accordance with some embodiments of the present disclosure, the operation panel comprises a display screen connected to the electric circuit board and a transparent protective board disposed on an exterior of the display screen for protecting the display screen, wherein the base portion comprises a window disposed thereon for accommodating the display screen, wherein the transparent protective board is secured to the window or a portion thereof.

In accordance with some embodiments of the present disclosure, the operation panel comprises a rotary knob disposed at a lower part of the base portion, and at least one control key disposed on a left side and a right side of the rotary knob, respectively.

An operation panel of an electric cooking appliance in accordance with example embodiments of the present disclosure comprises a substantially flat display panel and a control panel coupled to at least one side of the display panel and inclinedly disposed relative to the display panel; wherein the control panel comprises at least one control key disposed thereon for convenience of operation. Such a design provides an increased area of the display panel thereby providing a bigger displaying area without substantially enlarging the dimensions of the operation panel.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
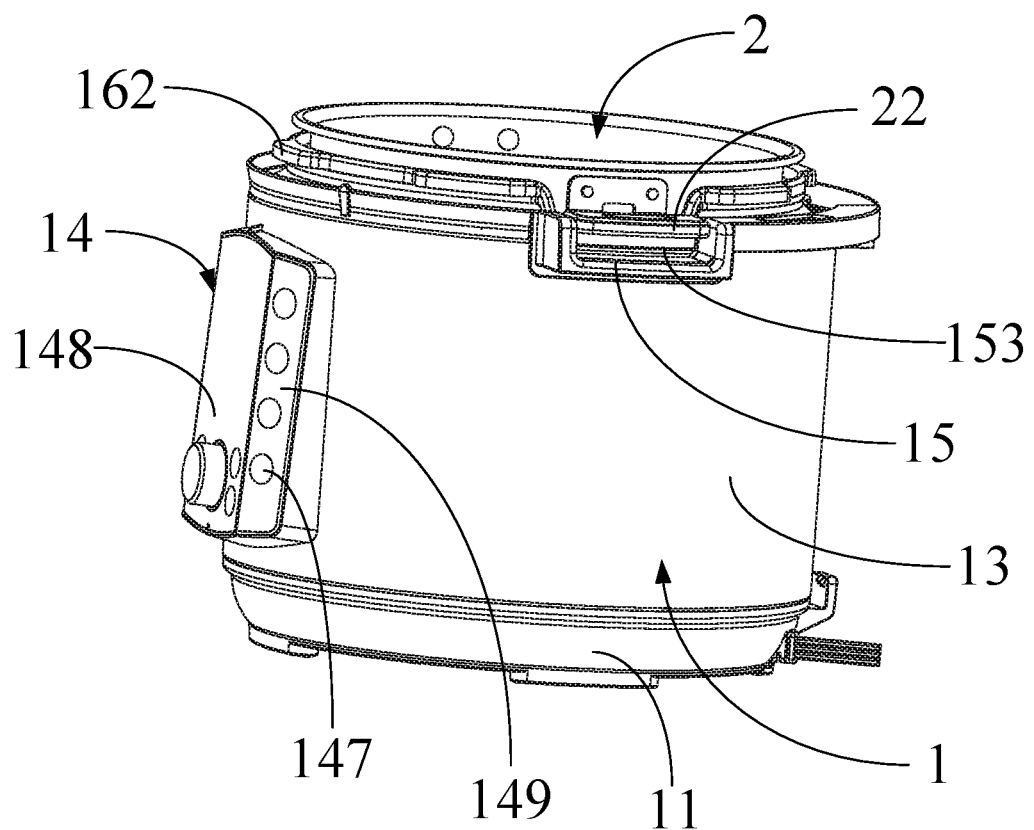
FIG. 1 is a perspective view illustrating an electric cooking appliance in accordance with an example embodiment of the present disclosure, without showing lid assembly.
Figure 2:
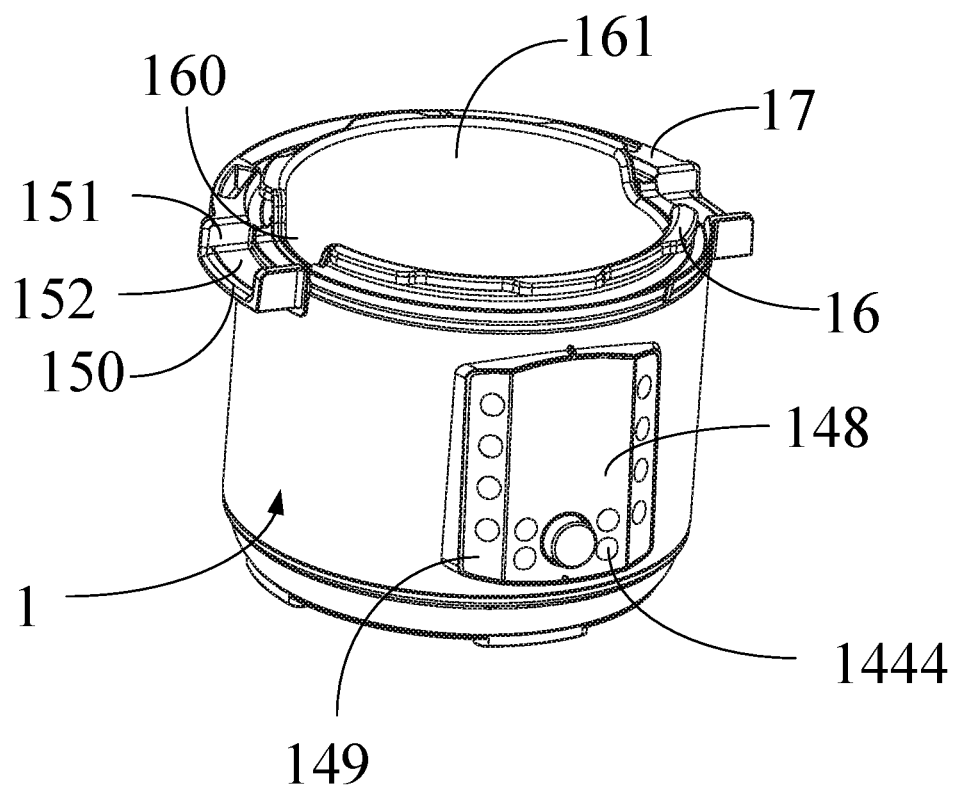
FIG. 2 is a perspective view of a cooker body of the electric cooking appliance of FIG. 1.
Figure 3:
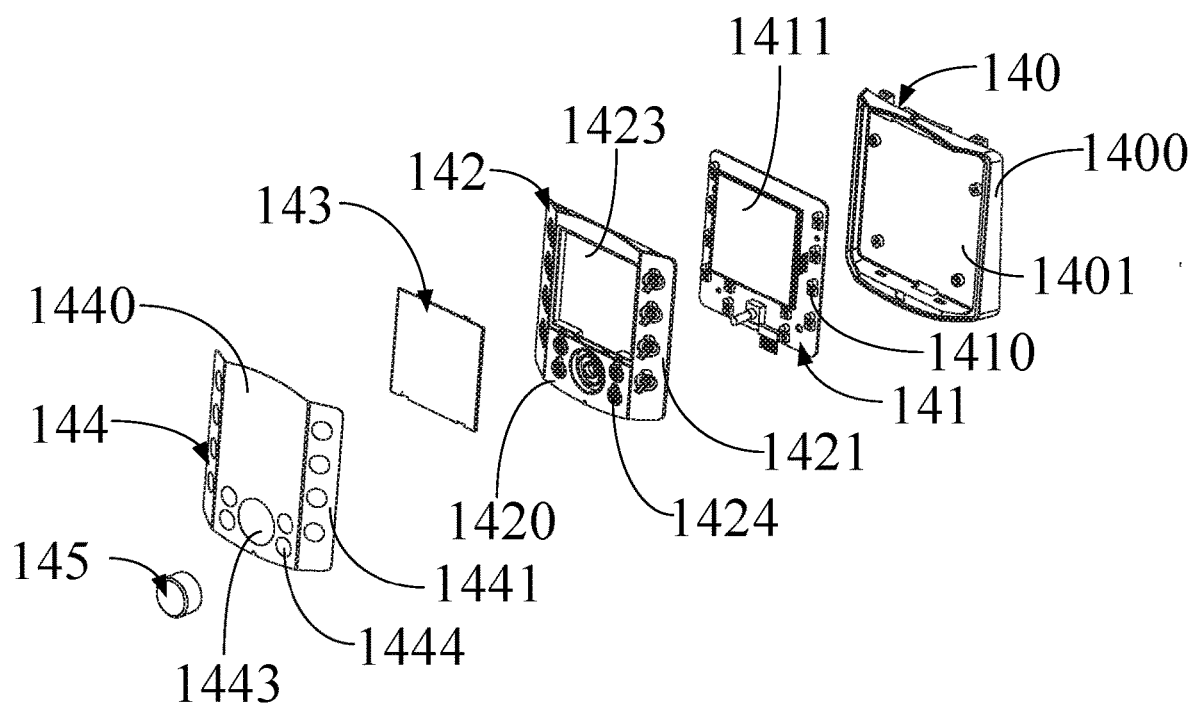
FIG. 3 is an exploded view of a panel assembly of the electric cooking appliance of FIG. 1.
Figure 4:
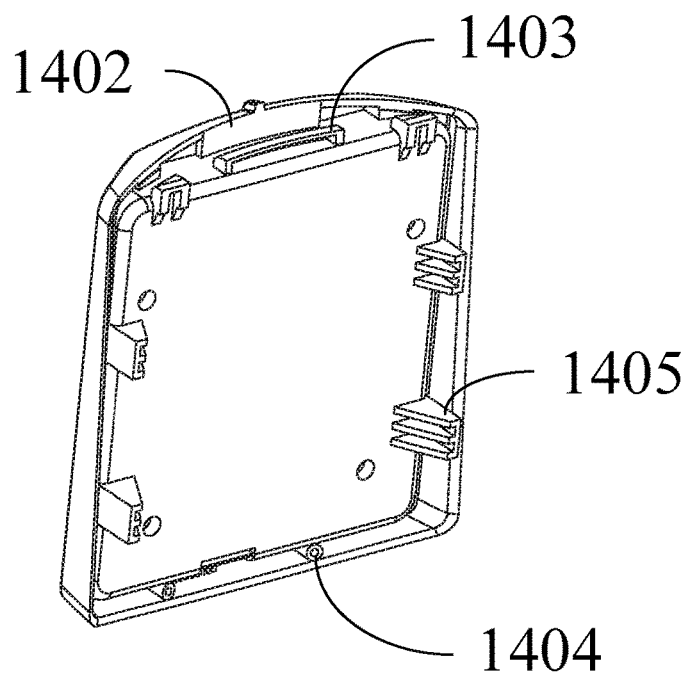
FIG. 4 is a perspective view of the panel assembly of FIG. 3.

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices consistent with some aspects of the present disclosure as detailed in the appended claims.

The terms used in the present application are for the purpose of describing particular embodiments only, and are not intended to limit the present application. Unless otherwise defined, technical terms or scientific terms used herein should have the ordinary meanings as understood by those having ordinary skilled in the art to which the invention pertains. The words "first", "second" and similar terms used in the specification and claims of the present application do not denote any order, quantity, or importance, but are merely used to distinguish different components. Similarly, the words "a" or "an" and the like do not denote a quantity limitation, but mean that there is at least one. "Multiple" or "several" means two or more. Unless otherwise indicated, the terms "front", "rear", "lower" and/or "upper" and the like are used for convenience of description and are not limited to one location or one spatial orientation. "Including" or "comprising" and similar words mean that the elements or objects that appear before "including" or "comprising" encompass the elements or objects listed after "including" or "comprising" and their equivalents, and do not exclude other elements or objects. The words "connection" or "connected" and the like are not limited to physical or mechanical connections, but may include electrical connections, whether direct or indirect. As used herein and in the appended claims, the singular forms "a", "said", and "the" are intended to include the plural forms unless the context clearly dictates otherwise. It should also be understood that, as used herein, the term "and/or" refers to and includes any or all possible combinations of one or more of the associated listed items.

Referring to FIGS. 1-4 and FIG. 9, an electric cooking appliance according to an example embodiment of the present disclosure can be an electric rice cooker or an electric pressure cooker or other similar electric cooking appliances. The electric cooking appliance comprises a cooker body 1, an inner pot 2 removably receivable within the cooker body 1, and a lid assembly 3 for covering the cooker body 1. In some embodiments, the cooker body 1 comprises a base 11, a substantially cylindrical or arc-shaped outer shell 13 mounted to the base 11, a middle board 17 covering at least a part of a top portion of the outer shell 13, an outer pot 16 mounted to the base 11, the outer shell 13 and the middle board 17, an inner pot 2 receivable within the outer pot 16, and an operation panel 14 secured to the outer shell 13. The outer pot 16 comprises one or more cooker teeth 162, whereas the lid assembly 3 comprises one or more lid teeth (not shown). When the lid assembly 3 is covering the cooker body, the lid assembly 3 is operable to be rotated to a closed position wherein the cooker teeth 162 and the corresponding lid teeth are lockingly engaged in a vertical direction such that the lid assembly 3 cannot be lifted from the cooker body 1. In some embodiments, the outer shell is made of metals or metallic materials.

In some embodiments, the operation panel 14 comprises a substantially flat display panel 148 and a control panel 149 coupled to at least one side of the display panel 148 and inclinedly disposed or oriented relative to the display panel 148; wherein the control panel 149 is inclinedly disposed or oriented such that an overall shape of the operation panel 14 at least partially approximates that of the cylindrical or arc-shaped shell 13; and wherein the control panel 149 comprises at least one control key 147 disposed thereon for conveniently operating the electric cooking appliance. Advantageously, such a design provides an increased area of the display panel 148, thereby providing a bigger displaying area without substantially enlarging the dimensions of the operation panel 14.

In some embodiments, the operation panel 14 comprises a rear installation panel 140 secured to the outer shell 13, an electric circuit board 141 secured to the rear installation panel 140, a button panel 142 disposed to cover the electric circuit board 141, a transparent protective board 143 secured to the button panel 142, a decorative film 144 covering the button panel 142, and a rotary knob 145 assembled to the button panel 142 and extending through the decorative film 144.

In some embodiments, the rear installation panel 140 comprises a panel portion 1400 comprising a receptacle 1401 disposed thereon, a first position-limiting member 1402 extending from the panel portion 1400, a second position-limiting member 1403 extending from the panel portion 1400, at least one fixing post 1404, and a plurality of positioning protrusions 1405. The electric circuit board 141 and the button panel 142 are disposed within the receptacle 1401. The first position-limiting member 1402 and the second position-limiting member 1403 are disposed at an upper portion of the rear installation panel 140, the at least one fixing post 1404 is disposed at a lower portion of the rear installation panel 140, and one or more positioning protrusions 1405 are disposed on a left side and a right side of the rear installation panel 140, respectively.

In some embodiments, the electric circuit board 141 can be fastened or secured to the rear installation panel 140 using a fastener such as a screw, or similar devices known in the art. In some embodiments, the operation panel 14 comprises a display screen 1411 connected to the electric circuit board 141, and a plurality of push buttons 1410 operable for push actions.

In some embodiments, the button panel 142 comprises a substantially flat base portion 1420 constructed and arranged to form or provide a shape for the substantially flat display panel 148, and a pair of inclined portions 1421 inclinedly extending from a left side and a right side of the base portion 1420, respectively; wherein the inclined portions 1421 are constructed and arranged to form or provide a shape for the inclinedly disposed control panel 149. The base portion 1420 comprises a window 1423 disposed thereon for accommodating the display screen 1411. The transparent protective board 143 is assembled or secured to the window 1423 or a portion thereof so as to protect the display screen 1411. The base portion 1420 and the inclined portions 1421 comprises a plurality of push portions 1424 correspondingly disposed to match with the plurality of push buttons 1410 of the electric circuit board 141, such that the push buttons 1410 can be triggered by pressing or pushing the corresponding push portions 1424. The rotary knob 145 is assembled to the base portion 1420 and is disposed below the window 1423. In some embodiments, one or more of the push portions 1424 are distributed on a left side and a right side of the rotary knob 145, respectively; one or more of the push portions 1424 are distributed on a left side and a right side of the window 1423, respectively; and one or more of the push portions 1424 are disposed on the inclined portions 1421.

In some embodiments, the decorative film 144 is configured to have a shape that is substantially similar to that of the button panel 142, the decorative film 144 comprising a body portion 1440 for covering the base portion 1420, and one or more extension portions 1441 for covering the one or more inclined portions 1421; wherein the body portion 1440 and the extension portions 1441 each comprises one or more protrusion portions 1444 corresponding to or matching with the push portions 1424, so as to protect the push portions 1424. The body portion 1440 comprises a through-aperture 1443 for allowing the rotary knob 145 to extend through. The decorative film 144 is constructed using suitable materials and arranged to function as a water resistant and dust resistant layer while being aesthetically pleasing. As such, the at least one control key 147 comprises a push portion 1424 disposed on the button panel 142 and a corresponding protrusion portion 1444 disposed on the decorative film 144.

Figure 5:
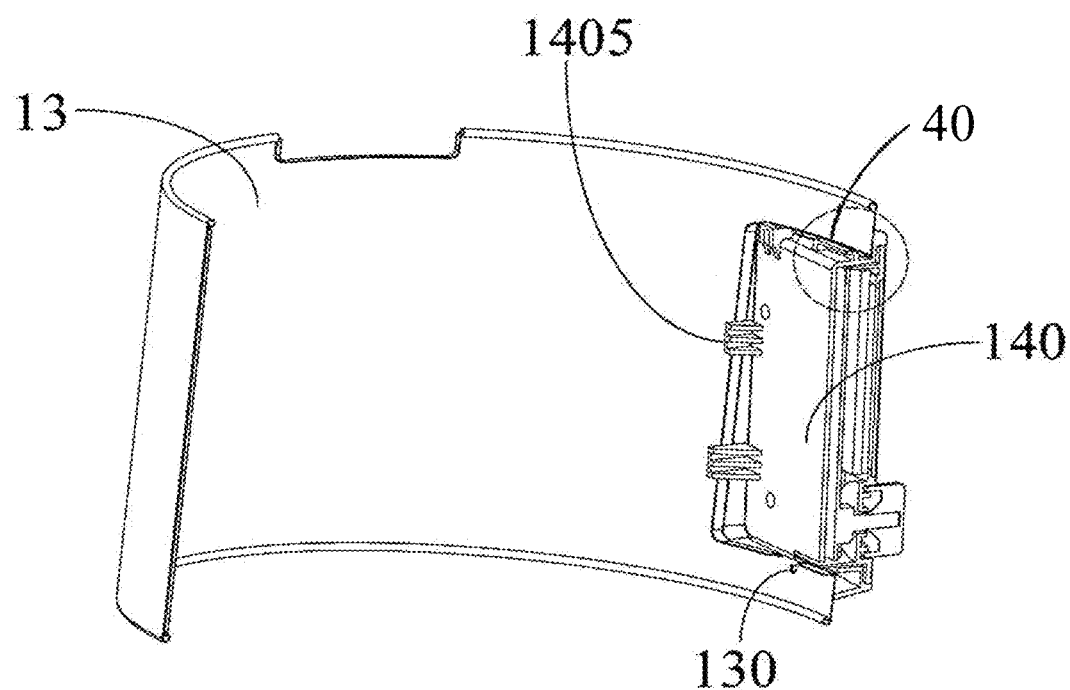
FIG. 5 is a schematic sectional view of the panel assembly of FIG. 4 assembled with an outer shell of the electric cooking appliance of FIG. 1.
Figure 6:
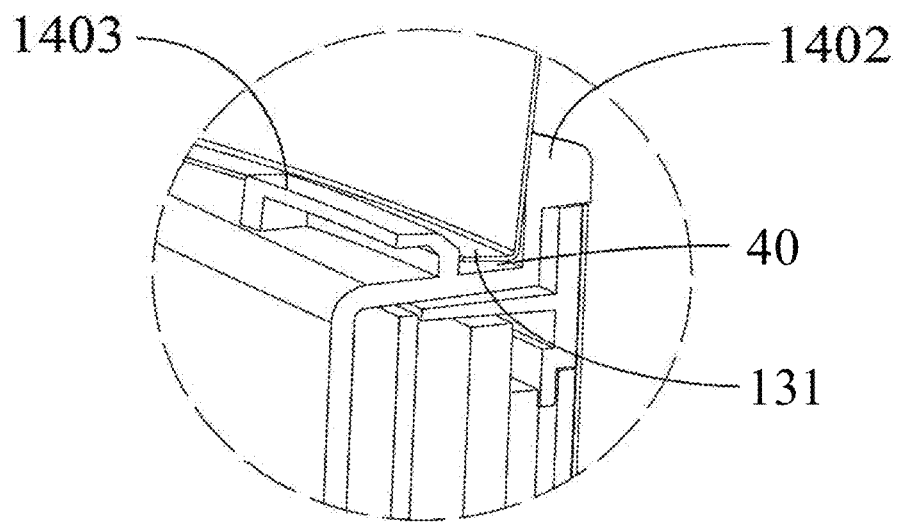
FIG. 6 is a magnified view of the circled area of FIG. 5.
Figure 7:
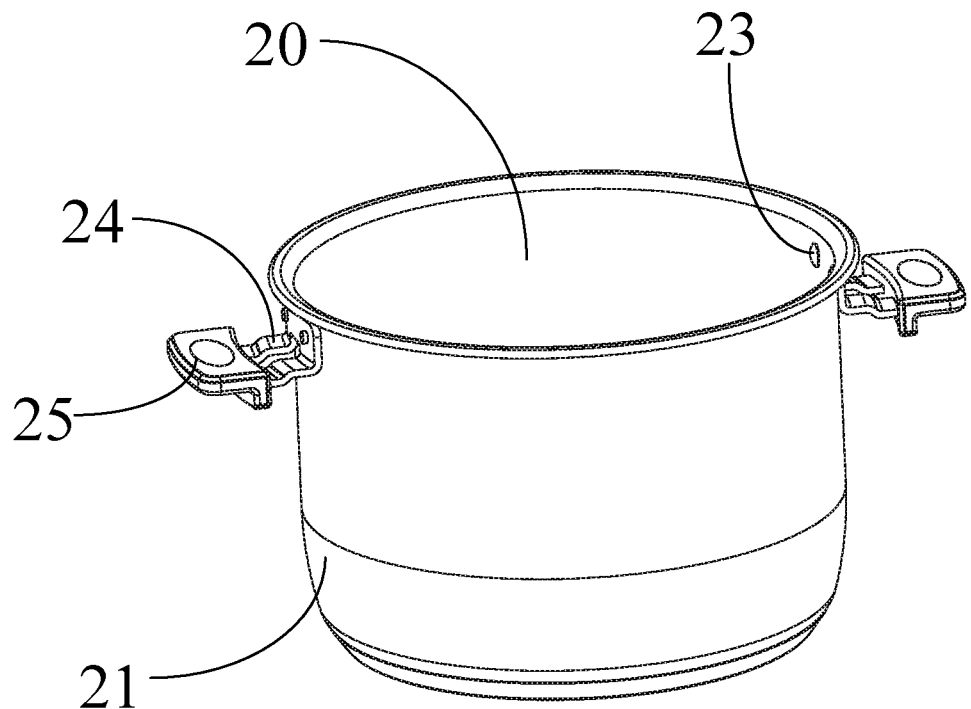
FIG. 7 is a perspective view of an inner pot shown in FIG. 2.

Referring now to FIGS. 5-6, in some embodiments, the outer shell 13 comprises an opening 40 and a flange portion 131 at least partially enclosing the opening 40 of the outer shell 13. The operation panel 14 is fastened or assembled to the opening 40. In such operation, for example, the operation panel 14 can be brought closer to the opening 40 and pushed upwardly toward the opening 40 in a slant direction relative to the opening 40, until the flange portion 131 is received between the first position-limiting portion 1402 and the second position-limiting portion 1403. Then the operation panel 14 can be pressed or pushed toward the outer shell 13, so that the positioning protrusions 1405 of the operation panel 14 are properly aligned with a periphery or border of the opening 40, and are pushed into the opening 40 against the periphery or border thereof. Next, a fastener such as a screw or other similar devices (not shown) can be used to secure an engagement between a mounting aperture 130 of the outer shell 13 and the fixing post 1404 from an interior side of the outer shell 13. For example, once the fixing post 1404 is aligned with and received within the mounting aperture 130, the fastener can be inserted into the mounting aperture 130 and screwed into the fixing post 1404 so as to securely fasten the operation panel 14 to the outer shell 13. Advantageously, the tight fitting between the positioning protrusions 1405 and the flange portion 131 effectively enhanced the stability of the operation panel 14.

Referring to FIGS. 1-2 and FIGS. 7-10, in some embodiments, the middle board 17 is disposed to substantially enclose or surround the outer pot 16 or a portion thereof. The outer pot 16 comprises a cavity 161 and a recess portion 160 in communication with the cavity 161. The inner pot 2 is operable to be removably received within the cavity 161 of the outer pot 16 for food cooking. In some embodiments, the middle board 17 comprises a pair of cooker handles 15 disposed exterior to the cavity 161 and extending outwardly from a sidewall of the cooker body 1, for lifting or moving the cooker body 1. The cooker handle 15 comprises a substantially flat handgrip portion 150 and a pair of sidewalls 151 extending upwardly from opposing sides of the handgrip portion 150, respectively, wherein the handgrip portion 150 and the pair of sidewalls 151 enclose or form a receiving groove 152.

In some embodiments, the inner pot 2 comprises an inner pot body 21 defining a cooking chamber 20, and a pair of inner pot handles 22 connected to the inner pot body 21. The inner pot handle 22 is constructed and arranged to fit within the receiving groove 152 when the inner pot 2 is received within the outer pot 16, and allows a user to lift the inner pot 2 out of the outer pot 16. In some embodiments, the handgrip portion 150 extends outwardly from the cooker body 1 to substantially align or overlap with the inner pot handle 22. In some embodiments, the handgrip portion 150 extends from the cooker body 1 beyond the inner pot handle 22, so that a user holding the cooker handles 15 will not mistakenly handle or grip the inner pot handles 22. In some embodiments, the inner pot handle 22 comprises a connecting member 24 fastened to the inner pot body 21 by a rivet 23 or similar devices, and a heat insulation member 25 coupled to the connecting member 24. In some embodiments, the heat insulation member 25 is assembled or attached to the connecting member 24, whereas in some other embodiments, the heat insulation member 25 is integrally formed with the connecting member 24 as a unitary piece. In some embodiments, the connecting member 24 is constructed and arranged to extend through the recess portion 160 of the outer pot 16, and the heat insulation member 25 is disposed outside of the outer pot 16.

In some embodiments, the inner pot handle 22 is spaced apart from the handgrip portion 150 for a predetermined width in a vertical direction when the inner pot 2 is placed within the outer pot 16, so as to define a gap 153 between the inner pot handle 22 and the handgrip portion 150 for allowing fingers of a user to be received therein. Advantageously, when a user is reaching for the inner pot handles 22 for lifting or handling the inner pot 2, his/her fingers will inevitably contact the cooker handles 15 or a part thereof, so as to provide the user the confirmation or assurance that he/she did not mistakenly grip the cooker handles 15. In some embodiments, the gap 153 has a width that is slightly narrower than an average thickness of an adult finger, for example, the gap width can be about 10 mm to about 13 mm, or within a similarly suitable range, thereby allowing convenient handling of the inner pot 2 while avoid mishandling of the inner pot 2.

Figure 10:
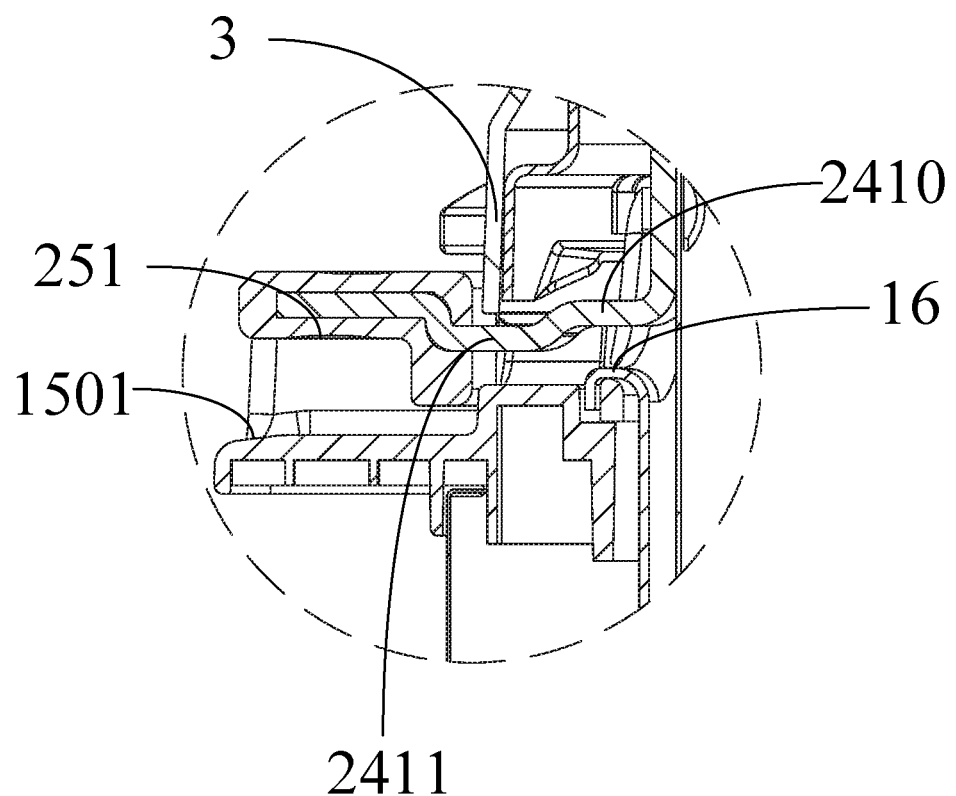
FIG. 10 is a magnified view of the circled area of FIG. 9.

Referring now to FIG. 10, in some embodiments, the handgrip portion 150 comprises a slope portion 1501 for ease of handing by hand, wherein a gap between a distal end of the slope portion 1501 and the inner pot handles 22 is about 11.5 mm to about 12.5 mm, and wherein a gap between a proximal end of the slope portion 1501 and the inner pot handles 22 is about 10.5 mm to about 11.5 mm.

In some embodiments, the heat insulation member 25 is made of plastic rubber materials or other similarly suitable materials so as to provide heat insulation from the connecting member 24 or prevent hand scalds or burns by the connecting member 24. In some embodiments, the heat insulation member 25 comprises an upwardly concaved recess portion 251 disposed on a bottom wall of the heat insulation member 25, wherein the recess portion 251 has a tapering shape such that a center portion of the recess portion 251 has a larger depth relative to the bottom wall of the heat insulation member 25 than a peripheral portion of the recess portion 251. Such tapering shape can be formed to be substantially similar to the shape of a fingertip so as to allow easy access by hand.

Figure 8:
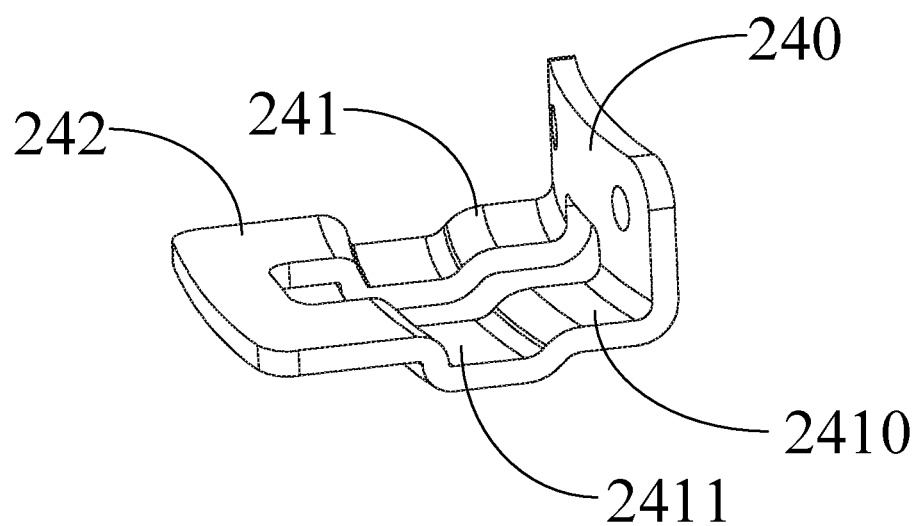
FIG. 8 is a perspective view of a connecting member of the inner pot of FIG. 7.
Figure 9:
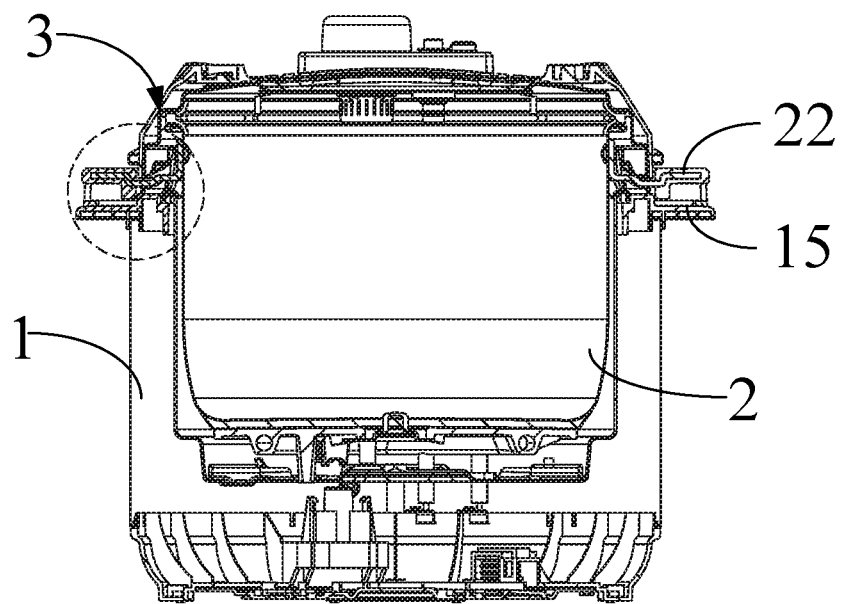
FIG. 9 is a schematic sectional view of an electric cooking appliance in accordance with an example embodiment of the present disclosure.

Referring to FIGS. 8 and 10, in some embodiments, the connecting member 24 is made of metals or metallic materials, and comprises a first attachment portion 240 constructed and arranged to snugly fasten or attach to the inner pot body 21, a connecting portion 241 substantially laterally or horizontally extending from the first attachment portion 240, and a second attachment portion 242 extending from the connecting portion 241. In some embodiments, the first attachment portion 240 is substantially arc-shaped so as to be in better conformity with the inner pot body 21. In some embodiments, the second attachment portion 242 is generally flat in shape or formed as a panel-like structure for secure attachment to the heat insulation member 25. In some embodiments, the heat insulation member 25 is integrally formed with the second attachment portion 242 as a unitary piece, whereas in some embodiments, the heat insulation member 25 is assembled or attached to the second attachment portion 242. In some embodiments, the connecting portion 241 comprises an upper portion 2410 disposed in proximity to the inner pot body 21 and a lower portion 2411 disposed in proximity to the heat insulation member 25; wherein the upper portion 2410 is constructed and arranged to provide clearance room for the outer pot 16 or accommodate the structure thereof, and the lower portion 2411 is constructed and arranged to provide clearance room for the lid assembly 3 or accommodate the structure thereof. In some embodiments, the second attachment portion 242 is constructed and arranged to bendingly extend from the connecting portion 241 in a upward direction and is disposed at raised position relative to the connecting portion 241 or a portion thereof, so that the heat insulation member 25 is disposed at an elevated position, thereby allowing the receiving groove 152 of the cooker handle 15 to be constructed with a relatively shallower depth, when comparing with the embodiments where the second attachment portion 242 is generally flat.

A cooker body 1 of an electric pressure cooker in accordance with example embodiments of the present disclosure comprises a cooker handle 15 disposed thereon, whereas the inner pot 2 comprises an inner pot handle 22 correspondingly disposed above the cooker handle 15 for retrieving the inner pot 2; wherein the cooker handle 15 comprises a insulation member 25 for preventing hand scalds or burns. The inner pot handle 22 and the handgrip portion 150 of the cooker handle 15 define a gap 153 therebetween, wherein the gap 153 has a width that is slightly narrower than an average thickness of an adult finger, so that when a hand of a user is received in the gap 153 for retrieving the inner pot 2, the hand will contact the handgrip portion 150, thereby reminding the user that it is the inner pot 2 that is currently being handled, and thereby preventing mishandling of the inner pot 2 or unintended handling thereof.

An operation panel 14 of an electric cooking appliance in accordance with example embodiments of the present disclosure comprises a substantially flat display panel 148 and a control panel 149 coupled to at least one side of the display panel 148 and inclinedly disposed relative to the display panel 148; wherein the control panel 149 comprises at least one control key 147 disposed thereon for convenience of operation. Such a design provides an increased area of the display panel 148 thereby providing a bigger displaying area without substantially enlarging the dimensions of the operation panel 14. In addition, the operation panel 14 is first fastened or assembled to the outer shell 13 or a portion thereof, and further securely fastened to the outer shell 13 by a fastener such as a screw or other similar devices, thereby providing ease of assemblage and effective secure attachment of the operation panel 14 to the outer shell 13.

The foregoing description is of preferred embodiments of the present application only, and is not intended to limit the present application in any way. Without departing from the technical scope of the present application, a person of ordinary skills in the art may make certain modifications or equivalent substitutions to the disclosed technical contents. Any simple modifications, equivalent changes or equivalent substitutions made to the above embodiments in accordance with the technical principle of the present application are still within the scope of the technical solutions of the present application.

What is claimed is:
1. An electric cooking appliance comprising:
a substantially arc-shaped outer shell; and an operation panel disposed on the outer shell, the operation panel comprising a substantially flat display panel, a first control panel coupled to a left side of the display panel, and a second control panel coupled to a right side of the display panel;

wherein the first and second control panels are inclinedly disposed relative to the display panel such that an overall shape of the operation panel at least partially approximates that of the substantially arc-shaped outer shell;

wherein the first control panel comprises a first plurality of control keys disposed vertically thereon for operating the electric cooking appliance;

wherein the second control panel comprises a second plurality of control keys disposed vertically thereon for operating the electric cooking appliance; and wherein the operation panel comprises a rotary knob disposed at a lower part of the display panel, the first plurality of control keys are disposed on a left side of the rotary knob, and the second plurality of control keys are disposed on a right side of the rotary knob.

2. The electric cooking appliance of claim 1, wherein:
the outer shell comprises at least one opening disposed thereon, the operation panel is assembled to the at least one opening;
the operation panel comprises a first position-limiting member and a second position-limiting member disposed at an upper portion of the operation panel, and a fixing post disposed at a lower portion of the operation panel;
at least a portion of the outer shell is fastened between the first position-limiting member and the second position-limiting member;
the outer shell further comprises a mounting aperture correspondingly disposed for engaging the fixing post; and
the electric cooking appliance comprises a fastener for securing an engagement between the mounting aperture and the fixing post from an interior side of the outer shell.

3. The electric cooking appliance of claim 2, wherein:
the operation panel comprises a rear installation panel secured to the outer shell; and
the first position-limiting member, the second position-limiting member, and the fixing post are disposed on the rear installation panel.

4. The electric cooking appliance of claim 3, wherein:
the rear installation panel comprises a panel portion comprising a receptacle disposed thereon;
the first position-limiting member and the second position-limiting member extend from the panel portion;
the operation panel further comprises an electric circuit board and a button panel disposed within the receptacle, the button panel comprising a substantially flat base portion and a pair of inclined portions inclinedly extending from a left side and a right side of the base portion, respectively;
the base portion is constructed and arranged to form a shape for the substantially flat display panel; and
the inclined portions are constructed and arranged to form a shape for the inclinedly disposed first and second control panels.

5. The electric cooking appliance of claim 4, wherein:
the operation panel comprises a decorative film covering the button panel; and
each control key of the first and second plurality of the at least one control keys comprises a push portion disposed on the button panel and a corresponding protrusion portion disposed on the decorative film.

6. The operation panel of claim 1, wherein the display panel extends at least half of the height of the outer shell.

7. An operation panel for assembling to a substantially arc-shaped outer shell, comprising:
a substantially flat display panel; and
a first control panel coupled to a left side of the display panel, and a second control panel coupled to a right side of the display panel;
wherein the first and second control panels are inclinedly disposed relative to the display panel such that an overall shape of the operation panel at least partially approximates that of the substantially arc-shaped outer shell;
wherein the first control panel comprises a first plurality of control keys disposed vertically thereon for convenience of operation;
wherein the second control panel comprises a second plurality of control keys disposed vertically thereon for convenience of operation; and wherein the operation panel comprises a rotary knob disposed at a lower part of the display panel, the first plurality of control keys are disposed on a left side of the rotary knob, and the second plurality of control keys are disposed on a right side of the rotary knob.

8. The operation panel of claim 7, wherein:
the operation panel comprises a rear installation panel secured to the outer shell, and an electric circuit board and a button panel secured to the rear installation panel;
the button panel comprises a substantially flat base portion constructed and arranged to form a shape for the substantially flat display panel, and a pair of inclined portions inclinedly extending from a left side and a right side of the base portion, respectively; and
the inclined portions are constructed and arranged to form a shape for the inclinedly disposed first and second control panels.

9. The operation panel of claim 8, wherein:
the operation panel comprises a decorative film covering the button panel; and
each control key of the first and second plurality of control keys comprises a push portion disposed on the button panel and a corresponding protrusion portion disposed on the decorative film.

10. The operation panel of claim 8, wherein the operation panel comprises:
a display screen connected to the electric circuit board;
a transparent protective board disposed on an exterior of the display screen for protecting the display screen;
the base portion comprises a window disposed thereon for accommodating the display screen; and
the transparent protective board is secured to the window or a portion thereof.

11. The operation panel of claim 7, wherein the display panel extends at least half of the height of the outer shell.

12. An electric cooking appliance comprising:
a substantially cylindrical outer shell; and
an operation panel disposed on the substantially cylindrical outer shell, the operation panel comprising a display panel, and a first control panel connected to a left side of the display panel and a second control panel connected to a right side of the display panel in a circumferential direction of the substantially cylindrical outer shell;

wherein the first control panel comprises a first plurality of control keys disposed vertically thereon for operating the electric cooking appliance;

wherein the second control panel comprises a second plurality of control keys disposed vertically thereon for operating the electric cooking appliance;

wherein the first control panel and the second control panel are angled to the display panel to follow an outer profile of the substantially cylindrical outer shell such that a height of the operation panel protruding from the outer profile of the substantially cylindrical outer shell is controlled within a predetermined range; and wherein the display panel comprises a lower portion of the display panel, the lower portion being assembled with a rotary knob, wherein the rotary knob is manually operable outside of the lower portion and coupled to a rotary post mounted on an electric circuit board.

13. The electric cooking appliance of claim 12, wherein:

the outer shell defines an opening with the operation panel assembled therein, the operation panel comprising a first protruding member and a second protruding member on a top face of the operation panel, an upper edge of the outer shell around the opening being positioned between the first protruding member and the second protruding member; and a fastener is disposed at a lower portion of the operation panel, the fastener is configured for securing the lower portion of the operation panel to a lower edge of the outer shell around the opening.

14. The electric cooking appliance of claim 13, wherein the operation panel comprises:

a rear installation panel with the first protruding member, the second protruding member and the fastener disposed thereon, the rear installation panel defining a front opening cavity;

a displaying assembly received in the front opening cavity; and a base portion covering the rear installation panel thereby securing the displaying assembly therein, the base portion defining a perspective area corresponding to the display panel and a key area corresponding to the first and second control panels, the first and second plurality of control keys being set on the key area.

15. The electric cooking appliance of claim 14, wherein the displaying assembly comprises:

an electric circuit board;

a display screen connected to the electric circuit board;

a transparent protective board disposed on an exterior of the perspective area; and wherein the transparent protective board is supported by the base portion and used for protecting the display screen.

16. The electric cooking appliance of claim 12, wherein the display panel extends at least half of the height of the outer shell.

17. The electric cooking appliance of claim 12, wherein the display panel is substantially flat.

\* \* \* \* \*